Nov. 18, 1969  G. W. DAVIES  3,478,758
WASHING AND STERILIZING DEVICE
Filed Feb. 13, 1967  2 Sheets-Sheet 1

GEORGE W. DAVIES
INVENTOR.

BY R. E. Geanque
ATTORNEY

GEORGE W. DAVIES
INVENTOR.

BY R. E. Geangue
ATTORNEY

United States Patent Office 3,478,758
Patented Nov. 18, 1969

3,478,758
WASHING AND STERILIZING DEVICE
George W. Davies, 4949 Tyrone Ave.,
Van Nuys, Calif. 91403
Filed Feb. 13, 1967, Ser. No. 615,779
Int. Cl. B08b 3/10
U.S. Cl. 134—85            6 Claims

ABSTRACT OF THE DISCLOSURE

An implement washing and sterilizing device having a liquid container for supporting an implement in an initial washing position within the contained liquid and a subsequent sterlizing and drying position above the liquid, wherein the implement is exposed to the direct rays of a germicidal lamp within the container and in the path of drying air circulated through the container by a blower which exhausts ozone gas generated by the lamp to atmosphere through a deodorizing cartridge.

---

This invention relates generally to sterilizing equipment and, more particularly, to a sterilizing device which utilizes the sterilizing action of a germicidal lamp.

A variety of sterilizing devices have been devised. Among the existing sterilizing devices, for example, are thermal sterilizers, such as autoclaves which rely on the sterilizing action of high temperature heat, gas sterilizers which rely on the sterilizing action of certain sterilizing gases, and sterilizers, such as the present sterilizer, which employ a germicidal lamp as the sterilizing medium. The existing sterilizers are characterized by certain inherent deficiencies which this invention seeks to overcome. The high temperature heat involved in the operation of autoclaves and other thermal sterilizers, for example, destroys the edges of blades and other sharp implements. Moreover, caution must be exercised when removing implements from a thermal sterilizer to avoid serious burns. Gas sterilizers, on the other hand, are generally characterized by excessive size, cost and complexity. The existing germicidal lamp sterilizers do not possess the noted deficiencies of either the thermal sterilizers or the gas sterilizers. The existing germicidal lamp sterilizers, however, are deficient in that they are either totally incapable of washing and drying the implements to be sterilized or produce a very inefficient washing and drying action on the implements.

It is a general object of the present invention to provide an improved sterilizing device which utilizes the sterilizing action of a germicidal lamp.

Another object of the invention is to provide a germicidal lamp sterilizing device wherein the implements to be sterilized are initially washed in a body of liquid with a unique whirlpool action and are then dried during sterilizing exposure to the germicidal lamp by drying air flow over the implements induced by a blower which exhausts ozone gas generated by the germicidal lamp to the surrounding atmosphere.

A related object of the invention is to provide a sterilizing device of the character described wherein ozone gas flow from the device occurs through a removable deodorizing cartridge.

Other objects of the invention are concerned with providing a sterilizing device of the character described which is relatively simple in construction, economical to manu-facture, compact in size, light in weight, and otherwise ideally suited to its intended purposes.

Other objects, advantages and features of the invention will become readily evident as the description proceeds, taken in conjunction with the accompanying drawings, in which.

Figure 1:
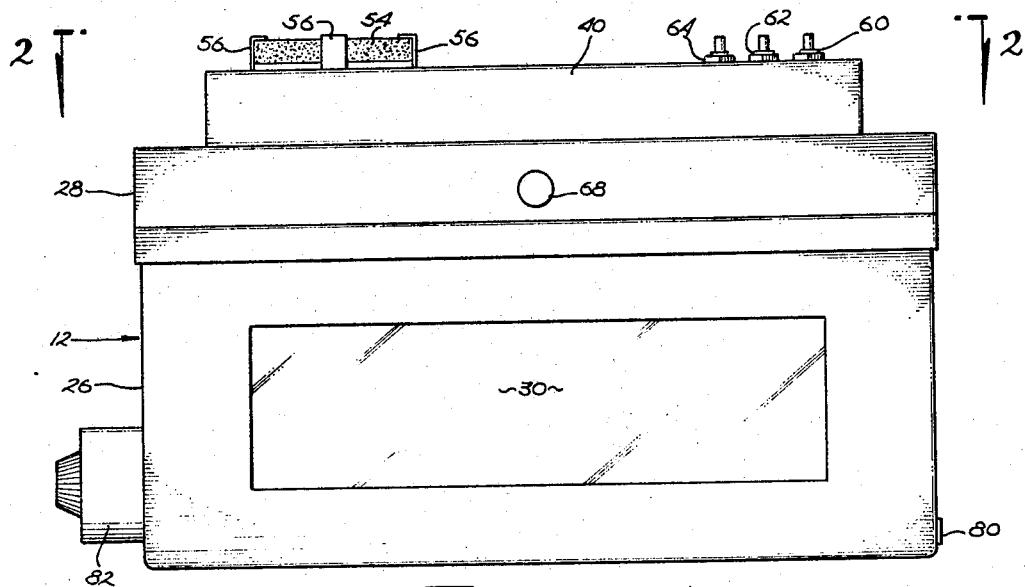
FIGURE 1 is a front elevation of a sterilizing device according to the invention.
Figure 2:
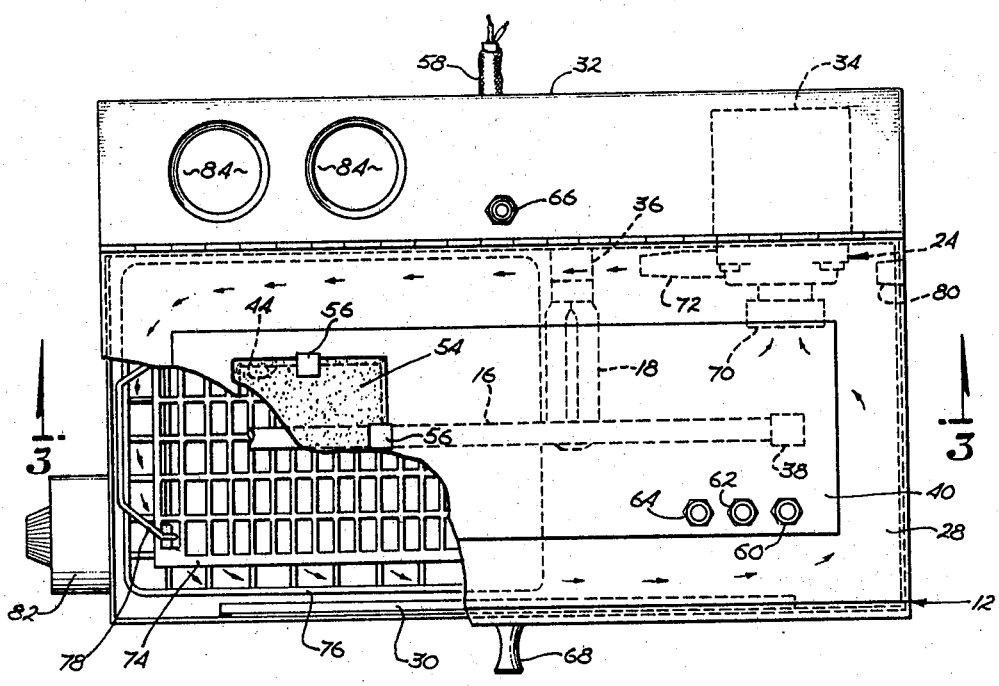
FIGURE 2 is a top plan view of the device looking in the direction of the arrows on line 2—2 in FIGURE 1, a portion of the device being broken away for the sake of clarity.
Figure 3:
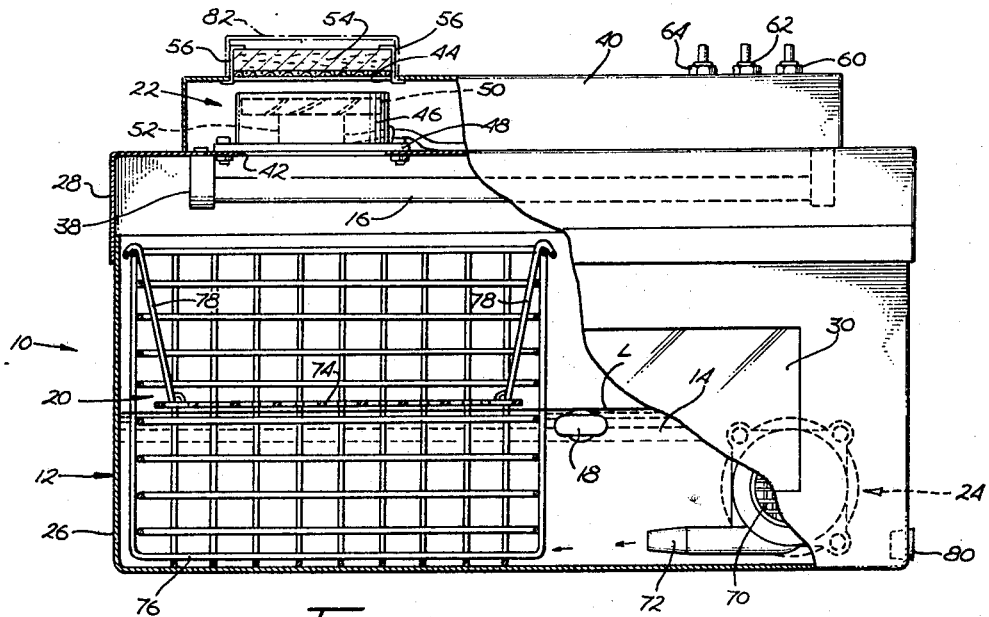
FIGURE 3 is a section taken on line 3—3 in FIGURE 2.
Figure 4:
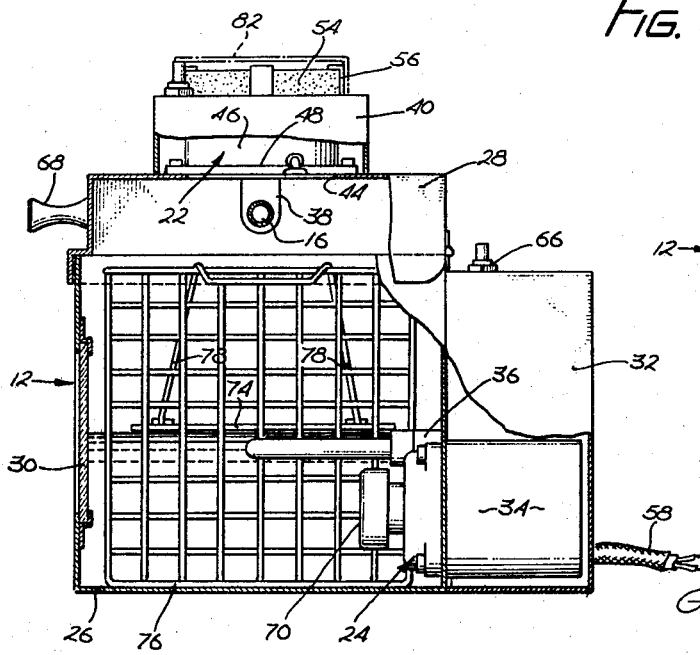
FIGURE 4 is a vertical transverse section through the sterilizing device.

In general terms, the sterilizing device 10 of the invention which has been selected for illustration in the drawings comprises a container 12 for containing a body of liquid 14. The level L of this liquid shown in FIGURE 3 is hereinafter referred to as the normal level of the liquid or simply the normal liquid level. Mounted within the container 10 are a pair of germicidal lamps 16 and 18. These germicidal lamps are preferably ultraviolet ray lamps, although other types of germicidal lamps may be employed in the device. The germicidal lamp 16 is mounted above the normal liquid level L. The germicidal lamp 18 is mounted below the normal liquid level. The sterilizing device is equipped with means 20 for supporting an implement to be sterilized in an initial washing position within the liquid and a subsequent drying and sterilizing position above the liquid wherein the implement is directly exposed to the bacteria-destroying rays from the sterilizing lamp 16. When in this drying and sterilizing position, the implement is dried by air flow over the implement. To this end, the sterilizing device 10 is equipped with a blower 22 for inducing air circulation through the container 12 and over the implement.

It is well known that a germicidal lamp, such as those employed in the present sterilizing device, generates ozone gas. One feature of the present invention resides in the arrangement of the blower 22 which is effective to exhaust from the container 10 to the surrounding atmosphere the ozone gas generated within the container by the upper germicidal lamp 16. This expulsion of the ozone gas to the surrounding atmosphere is beneficial for the reason that it produces a sterilizing action in the surrounding atmosphere. The lower germicidal lamp 18 produces a sterilizing action in the liquid 14 and may generate ozone in the liquid to aid its sterilizing action.

Mounted in the container 10, below the normal liquid level L, are means 24 for agitating the liquid 14 to promote washing of implements supported in their washing position within the liquid. A feature of the invention in this regard resides in the fact that the agitating means 24 comprise a pump for inducing in the liquid a whirlpool action which is effective to rapidly and thoroughly wash the implements. This whirlpool action also induces circulation of the liquid past the submerged germicidal lamp 18. In this latter regard, it is known that the rays from a sterilizing lamp are capable of penetrating a liquid only a relatively short distance. The use of the present whirlpool action to constantly circulate the liquid past the submerged germicidal lamp, therefore, is beneficial for the reason that substantially the entire body of liquid is effectively exposed to the sterilizing action of the lamp.

According to a further feature of the invention, the liquid 14 which is utilized in the present sterilizing device may comprise a buffered saline and sodium dodecyl sulfate solution having a sodium dodecyl content on the order of 0.1%, for example. It has been found that the rays from a germicidal lamp, such as the submerged lamp 18, when exposed to such a solution generate ozone within the liquid which promotes the sterilizing action of the lamp.

Briefly, in use of the sterilizing device 10, an implement to be sterilized is initially supported in its washing position within the container 12, wherein the implement is submerged within the liquid 14. The liquid agitating means or circulating pump 24 is then operated to induce a whirlpool action in the liquid which thoroughly washes the implement. The whirlpool action also effectively exposes the entire body of liquid 14 to the sterilizing rays of the submerged germicidal lamp 18.

Referring now in greater detail to the illustrated sterilizing device 10, the container 12 has a lower rectangular liquid tank 26 with an open top closed by a hinged cover or lid 28. Mounted in the front wall of the tank is a transparent window 30 through which the liquid 14 in the tank is visible. This window may comprise a tinted translucent plate secured and sealed to the inner side of the wall, as shown. The circulating pump 24 is mounted on the front side of the rear tank wall, below the normal liquid level L. At the rear of the tank is a compartment 32 which houses the pump motor 34. A gasket or other suitable sealing means (not shown) are provided between the pump and the rear housing wall to prevent leakage of liquid from the tank 26 into the compartment 32. The submerged germicidal lamp 18 is removably mounted in a liquid-tight socket 36 secured to the rear tank wall, below the normal liquid level L. The ballast (not shown) for this lamp may be housed in the rear compartment 32.

The tank lid 28 has an upper wall bounded by a depending flange which defines in the lid a chamber opening downwardly toward the tank 26. The germicidal lamp 16 is located within this chamber and is secured at its ends to sockets 38 attached to the underside of the upper lid wall, as shown. Mounted on the top of the lid is a compartment 40 which houses the blower 22 and the ballast (not shown) for the germicidal lamp 16. The upper wall of the lid 28 and the upper wall of the compartment 40 have aligned openings 42 and 44 which communicate the interior of the container 12 to atmosphere.

Blower 22 is conventional and includes an outer cylindrical shroud 46 having a lower flange 48 which seats on the upper wall of the container lid 28 about the lid opening 42. This flange is bolted to the lid, as shown. Rotatably mounted within the shroud 46, for turning on the axis of the shroud, is a fan 50. This fan is driven in rotation by a motor 52 concentrically mounted within the shroud. It is evident at this point that the blower 22 is effective to exhaust air from the container 12 to atmosphere through the opening 42 in the container lid 28 and the opening 44 in the upper lid compartment 40.

Extending across the opening 44 in the upper lid compartment 40 is a deodorizing cartridge 54. This deodorizing cartridge may comprise a fiberous pad impregnated with a suitable deodorizing agent. The deodorizing cartridge or pad may be releasably secured to the upper wall of the lid compartment 40 in any convenient way, as by means of spring clips 56. It is now obvious, therefore, that during operation of the blower 22, exhaust air flow from the container 12 occurs through the deodorizing cartridge 54, which is thereby effective to deodorize the emerging air. Preferably, the deodorizing agent embodied in the cartridge also imparts a fragrance to the emerging air.

Figure 5:
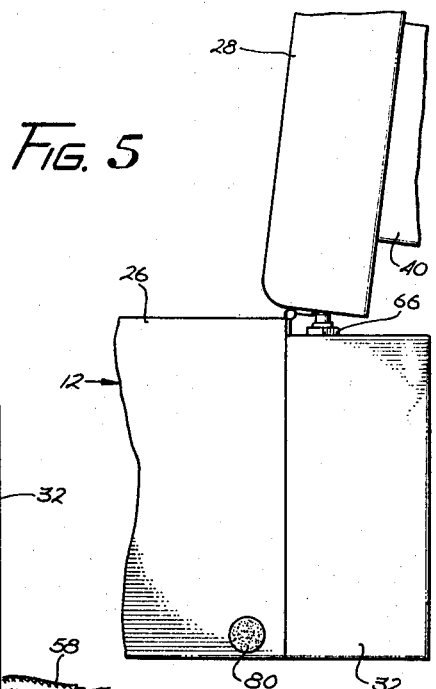
FIGURE 5 is a fragmentary end elevation of the sterilizing device showing a movable lid of the device in its open position.

Electrical power for energizing the germicidal lamps 16, 18, the circulating pump motor 34, and the blower motor 52 is conducted to the sterilizing device 10 through an electrical cable 58. The pump motor 34 and the blower motor 52 are energized from this cable through switches 60 and 62, respectively, which are mounted on the top wall of the upper lid compartment 40. The germicidal lamps 16, 18 are energized from the power cable 58 through a pair of switches 64 and 66. These switches are arranged in electrical series, such that both switches must be closed to energize the lamps. Switch 64 is mounted on the upper wall of the lid compartment 40 and is manually operated. Switch 66 is mounted on the upper wall of the rear tank compartment 62 in a position such that the switch is depressed and thereby opened by the container lid 28 when the latter is rotated to its open position of FIGURE 5. The switch is released to reclose upon closing of the lid. Thus, closing of the manual lamp switch 64 conditions the germicidal lamps 16, 18 for energizing upon closing of the container lid 28. The container lid, when opened, depresses the lamp switch 66 to turn off the germicidal lamps. If desired, a handle 68 may be mounted on the container lid 28 to facilitate opening and closing of the lid.

The circulating pump 24 has an axial intake 70 through which the liquid 14 is drawn into the pump and a tangential outlet 72 through which the liquid is expelled from the pump. This outlet opens circumferentially of the container tank 26, as shown. It is evident, therefore, that the circulating pump 24 is effective to induce vortical circulation of the liquid 14 through the tank and, thereby, to produce within the liquid the whirlpool action referred to earlier.

The illustrated implement positioning means 20 comprises a perforated tray 74 for holding an implement to be washed and sterilized and locating the implement in its aforementioned washing and sterilizing positions. It will be recalled that in its washing position, the implement is submerged in the liquid 14, and in its drying position, the implement is located above the liquid for direct exposure to the rays of the germicidal lamp 16. According to the present invention, this location of the implement in its washing and sterilizing positions may be accomplished in two alternative ways, to wit, by retaining the level of the liquid 14 constant and vertically shifting the implement tray 74 between its elevated drying and sterilizing position of FIGURE 3 and a submerged washing position within the liquid, and by retaining the implement tray in a fixed position and adjusting the level of the liquid.

To these ends, the implement tray 74 is contained within a perforated basket 76 which is removably mounted within the tank 26. The tray is equipped with pivoted hooks 78 which may be engaged over the upper edge of the basket 76, in the manner illustrated in FIGURE 3, to support the tray in its elevated position of the latter figure. In this position, the tray is located above the normal liquid level L, whereby an implement on the tray is removed from the liquid 14. In this position, then, the tray supports the implement in its drying and sterilizing position. The tray 74 may be lowered into the liquid 14, to locate an implement on the tray in its submerged washing position within the liquid, by disengaging the tray hooks 78 from the basket 76 and lowering the tray to the bottom of the basket.

To permit adjustment of the level of the liquid 14, one end of the container tank 26 is provided with a fitting 80 through which the liquid 14 may be fed to and drained from the tank. According to the alternative method referred to earlier, of locating an implement in its washing and sterilizing positions, the implement tray 74 is supported in its elevated position of FIGURE 3, and the liquid 14 is initially fed to the container 12, through the fitting 80, until the liquid level rises above the implement on the tray. The implement is then submerged in its washing position within the liquid. After washing, liquid is drained from the container through the fitting 80 until the liquid level drops below the tray, thus to locate the implement on the tray in its sterilizing position above the liquid. A hose (not shown) may be provided for connecting the fitting 80 to a liquid source, such as a water tap, and to a drain.

The operation of the illustrated sterilizing device 10 is believed to be obvious from the preceding description. Thus, an implement to be washed and sterilized is placed on the tray 74 and is initially submerged to its initial washing position in the liquid 14, either by lowering the tray to the bottom of the basket 76 or by supporting the tray in its elevated position of FIGURE 3 and feeding additional liquid to the container 12, through the fitting 80, until the liquid level rises above the implement. The container lid 28 is then closed and the germicidal lamps 16, 18 and the circulating pump motor 34 are energized. Operation of the circulating pump 24 induces a whirlpool action in the liquid 14 which circulates the liquid over the implement on the tray 74 to thoroughly wash the implement. This whirlpool action also exposes substantially the entire body of the liquid 14 to the bacteria destroying rays of the submerged germicidal lamp 18. In the event the liquid 14 is a buffered saline and sodium dodecyl sulfate solution of the kind mentioned earlier, exposure of the liquid to the rays from the submerged germicidal lamp 18 generates ozone in the liquid, thereby enhancing the sterilizing action of the lamp.

After the implement has been thoroughly washed, the circulating pump 24 is stopped, the blower 22 is started, and the implement is placed in its drying and sterilizing position, either by elevating the implement tray 74 to its position of FIGURE 3 or draining the liquid 14 from the container 12, through the fitting 80, until the liquid level drops below the tray. In this sterilizing position of the implement, the latter is directly exposed to the bacteria destroying rays from the upper germicidal lamp 16 and is thereby sterilized by the lamp. In this regard, a feature of the invention resides in the fact that the tray 74 may be constructed of a reflective material, such as aluminum, which is effective to reflect the rays of the lamp upwardly to the undersides of the implement. All surfaces of the implement are thereby effectively sterilized. Simultaneously, the implement is exposed to the circulating air flow which is induced within the container 12 by the currently operating blower 22. This air flow over the implement effectively dries the latter.

As noted earlier, the blower 22 also exhausts the ozone gas generated by the germicidal lamp 16 from the container 12 to atmosphere through the deodorizing cartridge 54, thus to produce a sterilizing action in the surrounding atmosphere. If desired, the sterilizing device 10 may be equipped with a removable cover 82 which may be placed over the cartridge 54 for closing the exhaust opening 44 in the upper container lid compartment 40, thereby to divert the air flow from the blower 22 back into the container 12 for more efficient drying of the implement currently supported in its drying position on the implement tray 74. In this case, the upper wall of the container lid 28 is provided with openings (not shown) through which the diverted air flow may pass from the interior of the compartment 40 to the interior of the container 12.

A timer 82 may be mounted on one end of the container 12 for timing the operation of the sterilizing device. Also, the rear compartment 32 may have receptacles 84 for holding implements to be sterilized or other objects.

A small motor may be enclosed in the casing at the rear of the container with special attachments for interchangeable brushes for removal of hard substances and stains from the articles being sterilized. Also, two revolving brushes rotating in opposite directions and spaced to receive hair clippers and other instruments may be provided to remove hairs and other particles from such instruments for cleaning purposes.

While the instant invention has been shown and described herein in what is conceived to be the most practical and preferred embodiments, it is recognized that departures may be made therefrom in the scope of the invention, which is therefore not to be limited to the details disclosed herein, but is to be afforded the full scope of the claims.

What is claimed is:
1. A washing and sterilizing device comprising:
a container having a top opening and a cover for closing said opening,
said container being adapted to be filled with a washing liquid to a given liquid level,
a lower germicidal lamp mounted within said container below said liquid level,
an upper germicidal lamp mounted within said container above said liquid level,
a power driven recirculating pump mounted within said container having an inlet and an outlet opening to the interior of said container below said liquid level for inducing forced circulation of said liquid about the interior of said container and past said lower germicidal lamp to effect sterilizing of said liquid by the rays from said lower lamp,
a fan mounted within said container above said liquid level for inducing air circulation about the interior of said container and past said upper germicidal lamp to effect sterilizing of the air by the rays from said upper lamp, and
means within said container for selectively supporting articles to be washed at either a submerged washing position in said liquid wherein said articles are disposed to be washed and sterilized by circulation of said liquid over said articles, or at a draining position above said liquid wherein said articles are disposed to be sterilized by rays from said upper germicidal lamp and dried by circulation of air over said articles.

2. A washing and sterilizing device according to claim 1 wherein:
said pump outlet is located adjacent a side wall of said container and opens generally circumferentially of said container for inducing whirlpool circulation of said liquid around the interior of said container.

3. A washing and sterilizing device according to claim 1 wherein:
said container has an exhaust opening to the atmosphere located opposite the exhaust side of said fan, whereby sterilized air may exhaust from said container through said exhaust opening, and
a removable closure for sealing said exhaust opening to effect recirculation of air within said container only.

4. A washing and sterilizing device according to claim 3 including:
a porous filter to be impregnated with a deodorizing agent, and means removably mounting said filter within said exhaust opening.

5. A washing and sterilizing device according to claim 1 wherein:
said cover has spaced inner and outer walls defining an intervening chamber, and exhaust openings in said walls communicating the interior of said container to atmosphere,
said fan is mounted within the exhaust opening in said inner cover wall for inducing air flow from the interior of said container into said intervening chamber,
said inner cover wall has a return opening communicating said intervening chamber to the interior of said container, and
a removable closure for selectively sealing the exhaust opening in the outer cover wall, whereby air may be either recirculated only within said container or exhausted from said container to the atmosphere.

6. A washing and sterilizing device according to claim 5 wherein:
said pump outlet is located adjacent a side wall of said container and opens generally circumferentially of said container for inducing whirlpool circulation of said liquid around the interior of said container.

References Cited

UNITED STATES PATENTS

| 1,961,700 | 6/1934 | Moehler | 250—51 |
| 2,085,573 | 6/1937 | Buttolph. | |
| 2,191,816 | 2/1940 | Conley | 21—102 XR |
| 2,293,618 | 8/1942 | Nelligan et al. | |
| 2,512,747 | 6/1950 | Lewis | 21—83 |
| 2,648,774 | 8/1953 | Whitlock | 250—43 |
| 2,786,245 | 3/1957 | Steinbock | 21—105 |
| 2,889,837 | 6/1959 | Braun et al. | 21—102 XR |
| 3,058,134 | 10/1962 | Wozniak-Rennek | 21—87 XR |
| 3,184,277 | 5/1965 | Stevens | 21—102 XR |
| 3,299,620 | 1/1967 | Hollingworth | 21—102 XR |

MORRIS O. WOLK, Primary Examiner

B. S. RICHMAN, Assistant Examiner

U.S. Cl. X.R.

21—54, 83, 87, 91, 102, 105; 134—135; 250—43, 51